(12) United States Patent
Budde et al.

(10) Patent No.: US 7,099,959 B1
(45) Date of Patent: Aug. 29, 2006

(54) NETWORK COMPRISING A PLURALITY OF NETWORK NODES AND AT LEAST ONE STAR NODE

(75) Inventors: Wolfgang O. Budde, Aachen (DE); Manfred Zinke, Aachen (DE); Peter Fuhrmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 650 days.

(21) Appl. No.: 09/663,594

(22) Filed: Sep. 18, 2000

(30) Foreign Application Priority Data

Sep. 16, 1999 (DE) ............................ 199 44 596
Sep. 16, 1999 (DE) ............................ 199 44 597

(51) Int. Cl.
G06F 15/16 (2006.01)
G06F 15/173 (2006.01)
H04L 12/43 (2006.01)
G02B 6/42 (2006.01)

(52) U.S. Cl. .................. 709/252; 709/223; 370/458; 385/46

(58) Field of Classification Search ............ 709/252, 709/223, 224; 370/458; 385/46, 48, 27, 385/24; 398/43, 48, 98, 101
See application file for complete search history.

(56) References Cited

U.S. PATENT DOCUMENTS

| | | | |
|---|---|---|---|
| 4,352,180 A * | 9/1982 | Schulze ..................... 370/403 |
| 4,428,046 A | 1/1984 | Chari et al. ................. 364/200 |
| 4,630,254 A * | 12/1986 | Tseng ......................... 370/412 |
| 4,641,375 A * | 2/1987 | Dean .......................... 370/491 |
| 4,694,453 A * | 9/1987 | Kobayashi et al. ......... 370/249 |
| 4,747,094 A * | 5/1988 | Sakaguchi et al. .......... 398/101 |
| 4,781,427 A * | 11/1988 | Husbands et al. ........... 385/24 |
| 4,866,702 A * | 9/1989 | Shimizu et al. ............. 370/438 |
| 5,127,067 A * | 6/1992 | Delcoco et al. ............. 385/24 |
| 5,189,414 A * | 2/1993 | Tawara .................... 340/825.5 |
| 5,200,949 A * | 4/1993 | Kobayashi ................. 370/228 |
| 5,218,600 A * | 6/1993 | Schenkyr et al. ........... 370/217 |
| 5,463,488 A * | 10/1995 | Grimes ....................... 398/48 |
| 5,621,895 A | 4/1997 | Weis et al. ................. 395/200 |
| 5,764,630 A * | 6/1998 | Natali et al. ................ 370/320 |
| 6,076,117 A * | 6/2000 | Billings ....................... 709/253 |
| 6,091,740 A * | 7/2000 | Karasawa .................... 370/458 |
| 6,493,335 B1 * | 12/2002 | Darcie et al. ............... 370/344 |
| 6,996,115 B1 * | 2/2006 | Budde et al. ............... 370/407 |

OTHER PUBLICATIONS

"Collision Avoidance Tree Networks", by Hung K. Huang et al, Computer Networks and ISDN Systems, pp. 895-911.

* cited by examiner

*Primary Examiner*—Saleh Najjar
*Assistant Examiner*—Kevin T Bates
(74) *Attorney, Agent, or Firm*—Adam L. Stroud (57) ABSTRACT

The invention relates to a network comprising a plurality of network nodes. At least part of the network nodes are directly intercoupled via at least one star node. The star node contains a plurality of star interfaces which are assigned to at least one network node. A star interface is provided for transferring a message from the assigned network node to the other star interfaces or from another star interface to at least one of the assigned network nodes always in dependence on a pilot signal.

16 Claims, 6 Drawing Sheets

NETWORK COMPRISING A PLURALITY OF NETWORK NODES AND AT LEAST ONE STAR NODE

BACKGROUND OF THE INVENTION

The invention relates to a network comprising a plurality of network nodes. Such networks may be installed, for example, in private cars, in industrial automation (for example, sensor systems) and domestic automation (for example, lighting, alarm systems, heating system, air-conditioning system, etc.).

In such a network for private cars can be used, for example, the TTP protocol (TTP=Time-Triggered Protocol) known from the journal "Elektronik", No. 14, 1999, pp. 36 to 43 (Dr. Stefan Blenda, Georg Kroiss: "TTP: "Drive by Wire" in greifbarer Nähe"). This protocol makes a reliable data transmission possible and may therefore also be used in networks concerning safety devices (for example brakes). Said article mentions a bus system as a network structure.

SUMMARY OF THE INVENTION

It is an object of the invention to provide a different network comprising more network nodes.

The object is achieved by a network of the type defined in the opening paragraph, in that at least part of the network nodes are directly intercoupled via at least one star node, in that the star node contains a plurality of star interfaces which are assigned to at least one network node and in that, in dependence on a pilot signal, one star interface always conveys a message from the assigned network node to the other star interfaces, or from another star interface to at least one of the assigned network nodes.

The underlying idea of this invention is the control of a star node by means of a pilot signal which is generated by the network nodes. The pilot signal is changed before and after a transmission of a message in that a star interface contained in the star node and assigned to a network node detects when the assigned network node changes the pilot signal. In the star node the other star interfaces are then switched, so that they receive only a message from the star interface that receives a message from the assigned network node.

The star interfaces provide a correct line terminal at the input of a star interface and by means of the pilot signal an unambiguous control of the traffic of messages.

Each network node in the network is assigned a certain periodically recurrent time section for the transmission of its messages. The pilot signal generator in a network node signalizes this time section when a pilot signal is transmitted. The pilot signal may be distinguished from the actual message in various ways. For example, the pilot signal uses a different frequency range from the signal having the message to be transmitted.

Each star interface contains a first and a second switch element and a pilot signal detector. The switch elements, which may be a switchable amplifier, control the flow of messages in a star interface in dependence on the pilot signal.

During the transmission of messages, which is indicated by the pilot signal, a star interface generates a release signal which is applied to the other star interfaces via an OR combination. The OR combination may be arranged as an OR gate or as a wired OR combination.

The use of a pilot signal for controlling the traffic of messages makes the optional addition of redundant line connections possible, so that for each additional line connection a further star interface is added. Furthermore, for each additional line connection the network node is extended by one circuit component for transmitting a message combined with a pilot signal and for receiving such a message. An additional control is necessary for detecting defects and selecting a line connection.

For example, with symmetrical signal transmission a line connection may be a line pair.

The invention relates to a network node, which is characterized in that the network node is provided for the coupling to further network nodes via at least one star node, and in that for the coupling to further network nodes the network node has a pilot signal to indicate a message transmission to a star interface of the star node.

Furthermore, the invention relates to a star node in a network for coupling a plurality of network nodes to a plurality of star interfaces which are assigned at least to one network node and which, always in dependence on a pilot signal, are arranged for conveying a message from the assigned network node to the other star interfaces, or from another star interface to at least one of the assigned network nodes.

Examples of embodiment will be explained with reference to the Figures.

DESCRIPTION OF THE PREFERRED EMBODIMENTS

Figure 1:
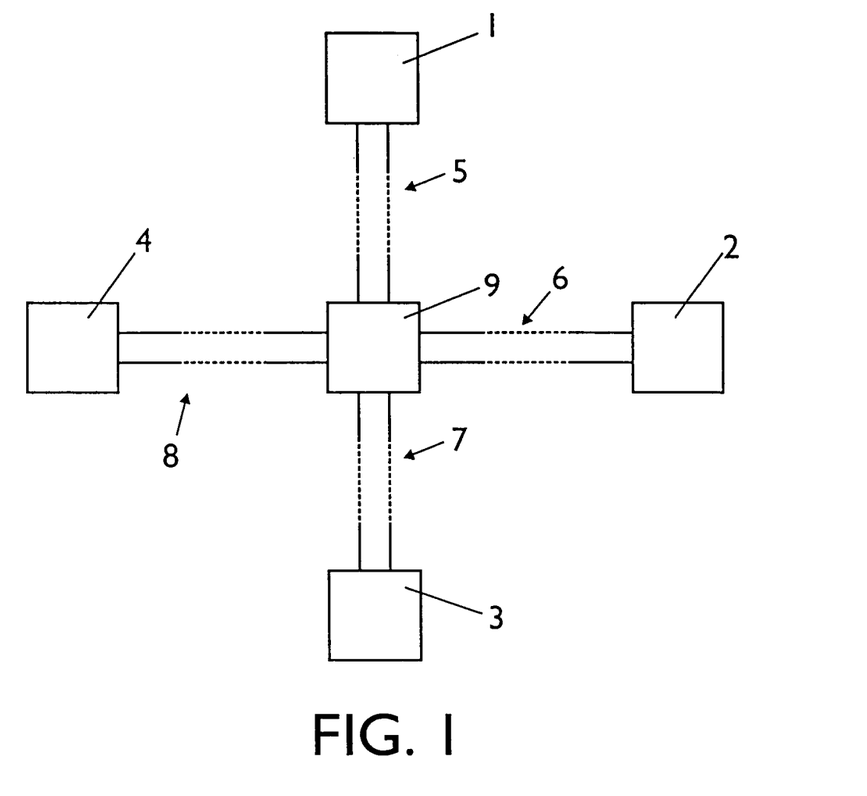
FIG. 1 shows a network in a star structure, comprising a plurality of network nodes, which are coupled via an active star node.

An example of embodiment of the network according to the invention is shown in FIG. 1. This network contains, for example, four network nodes 1 to 4, which are intercoupled via an active star node 9 through line pairs (twisted pairs) 5 to 8 provided for a symmetrical signal transmission. The active star node 9 performs a line adaptation, so that the line pairs 5 to 8 in the active star node 9 are terminated by a wave resistor, and detects a pilot signal transmitted by a network node 1 to 4. If the line pairs 5 to 8 were interconnected without the active star node 9, there would be a mismatch in the neutral point for each line pair as a result of the impedance jump from $Z_0$ to $\frac{1}{3}Z_0$, which is caused by the fact that the respective other line pair is connected in parallel. For generating a pilot signal, each network node 1 to 4 further includes a pilot signal generator.

Figure 2:
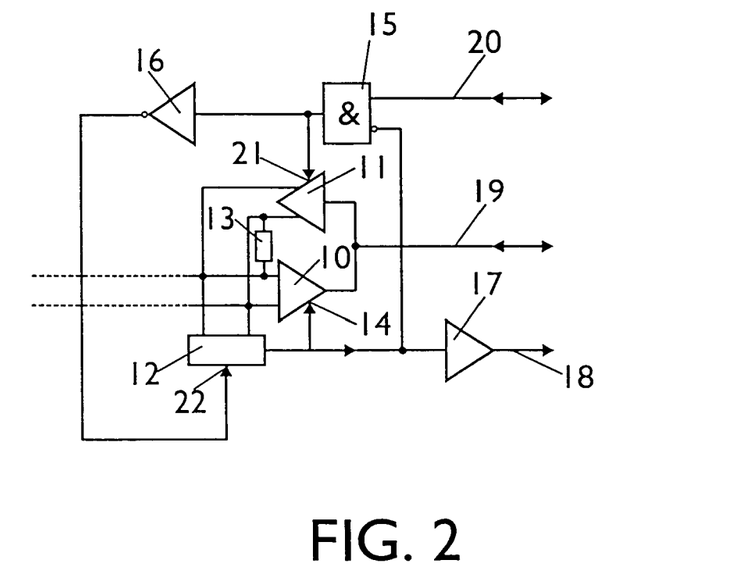
FIG. 2 shows a first embodiment of a star interface in a star node.
Figure 3:
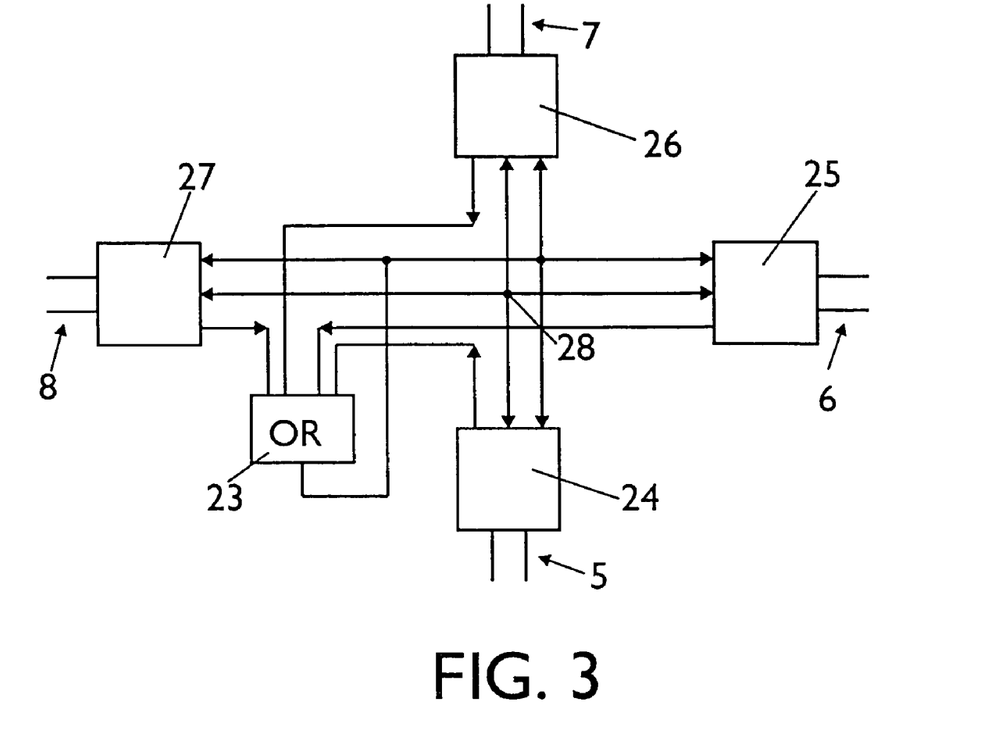
FIG. 3 shows a first embodiment of a first star node.

The active star node 9 contains for each line pair 5 to 8 a star interface which enables a transfer of the messages from a transmitting network node to all the other network nodes connected to the active star node. An example of embodiment of such a star interface is shown in FIG. 2. A line pair 5 to 8 is connected to the inputs of a switchable amplifier 10, to the outputs of a further switchable amplifier 11, to a pilot signal detector 12 and to a terminal resistor 13. The value of the terminal resistor 13 corresponds to the wave resistance and is therefore used for the correct line termination. When the pilot signal detector 12 detects a pilot signal, it generates a release signal which is led to a switch input 14 of the switchable amplifier 10, to an inverting input of an AND gate 15 and, via an amplifier 17 and a line 18, to an OR gate 23 (FIG. 3). When the switchable amplifier 10 has been released, it supplies data to a data line 19, which leads to a switching point. This data line 19 also receives data from the other star interfaces and transfers them via the switchable amplifier 11 to the assigned line pair. Via a line 20 the non-inverting input of the AND gate 15 is supplied with a release signal produced by another star interface, via the OR gate 23 (FIG. 3). The non-inverting output of the AND gate 15 is connected to a switch input 21 of the switchable amplifier 11 and, via an inverter 16, to a release input 22 of the pilot signal detector.

A switchable amplifier 10 or 11 may also be arranged as a series combination of amplifier and switch (switch element). In the closed state of this switch, the output signal of the amplifier is transmitted.

The pilot signal detector detects whether the assigned network node shows, by transmitting the pilot signal, that it intends to transmit messages or data, respectively. If this is the case, the amplifier 11 is deactivated (generally it will already have reached this state) and the amplifier 10 is activated or released. The message signal coming from the assigned line pair is led to the line 19 and transferred there to the other star interfaces. Additionally, the release signal generated by the pilot signal detector 12 signalizes the other star interfaces that they are to activate or release their respective amplifier 11 in order to transfer the messages to the respective assigned network nodes.

As shown in FIG. 3, the lines 18 of all the star interfaces are combined in the OR gate 23. Furthermore, FIG. 3 shows four star interfaces 24 to 27 which are respectively coupled to the line pairs 5 to 8. The output of the OR gate 23 is connected to the lines 20 (FIG. 2) of the star interfaces 24 to 27. Lines 19 (FIG. 2) of the star interfaces 24 to 27 are combined via a circuit node 28.

To avoid a signal coming from a line pair 5 to 8 again being returned to the same pair, the amplifier 11 is deactivated or switched off via the inverting input of the AND gate 15. On the other hand, to avoid the pilot signal detector assigned to another network node activating its own amplifier 10, the release signal transported over the line 20 (FIG. 2) is used via AND gate 15 and inverter 16 to suppress the release signal for the pilot signal detector 12. This also switches off or deactivates the amplifier 10 via its switch input 14. The pilot signal detector 12, whose pilot signal causes the assigned star interface to receive data, however, remains active for detecting the end of the data transmission.

For the perfect functioning of the active star node 9 it is necessary that the network nodes 1 to 4 transmit their messages not overlapping with time. In addition, it is to be ensured that for the duration of a certain dead time no network node is active or transmits messages or data, respectively. In this state the star node is fully blocked (i.e. all the amplifiers 10 and 11 are deactivated). In this state a star interface 24 to 27 in the star node 9 waits for a new pilot signal, by which a request for transmitting messages is indicated. Basically it holds that the pilot signal is always to be transmitted ahead of the beginning of the transmission of the actual message. Only then will it be ensured that the active star node 9 is timely configured and that also the beginning of the message reaches all the other network nodes.

Figure 4:
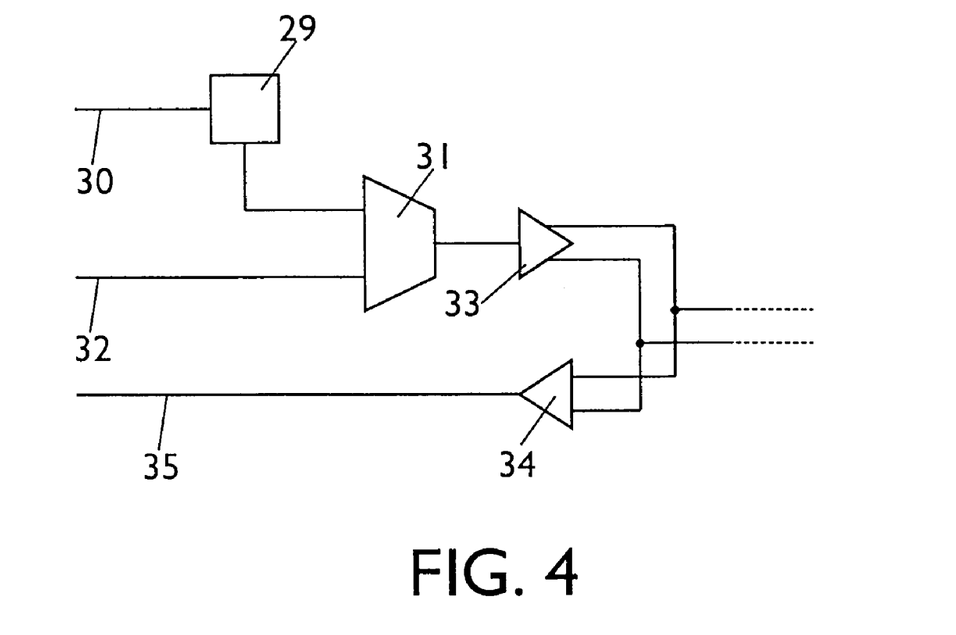
FIG. 4 shows part of a network node comprising a pilot signal generator.

FIG. 4 shows in what manner the pilot signal is generated in a network node 1 to 4 and transmitted over a line pair 5 to 8. When a network node wishes to transmit a message or data to other network nodes, a pilot signal generator 29 receives for example a star signal over a line 30. The pilot signal generator 29 then delivers a pilot signal to a multiplexer 31 to which data to be transmitted are supplied via a line 32. The signal produced by the multiplexer 31 is applied to the assigned line pair via an amplifier 33. A signal originating from another network node is led by the line pair via an amplifier 34 onto a line 35 for further processing.

The multiplexer shown in FIG. 4 may then be arranged both as a time multiplexer (transmission of the pilot signal as a start and a stop signal each time before and after the actual message), or as a frequency multiplexer. This means that the pilot signal may accompany either as a continuous signal the whole message to be transmitted, or that it can be transmitted in the form of a start and a stop signal. For example, as a result of different durations, there may then be ensured that the start and the stop signal are sufficiently distinguished and the change between transmission time and transmission pause is not mixed up.

The pilot signal may be generated in various ways. One possibility is that it may be a periodic signal, whose frequency range lies outside the frequency range used for the transmission of the messages. This frequency range may lie above or below the useful frequency band, but also in "gaps" of the effective frequency band. A further possibility is to transmit the actual message as a symmetrical push-pull signal and the pilot signal as an in-phase signal. The in-phase signal may be in the form of a constant voltage, but also in the form of a periodic signal. A third possibility for the pilot signal is that it is realized in the form of special symbols put before or after the transmitted message.

The proposed invention is particularly suitable for use in networks operating according to the TTP protocol for a real-time communication, for example, in private cars (compare Elektronik Heft 14/1999: "TTP: "Drive by Wire" in greifbarer Nähe" pp. 36 to 43). With this protocol there is determined, on the one hand, when which transmitter is allowed to transmit with the aid of the conflict-free TDMA access method (TDMA=time-division multiple access) and, on the other hand, a dead time (interframe gap) is defined in which no transmitter is allowed to transmit. This mechanism immediately guarantees that the active star node 9 always goes back to the state of rest. Thus the TDMA method guarantees that always only one network node is allowed to transmit a message at a predefined time and, for this purpose, by means of the pilot signal transmitted by it activates or causes to activate in the star node the star interface assigned thereto to transfer messages.

An additional advantage is that for controlling the so-called bus guardian, a control signal is to be present in the network node, which signal lies shortly before the beginning of the transmission of the message. This control signal may be used directly for controlling the pilot signal generator 29 in that this control signal is applied to the pilot signal generator 29 over the line 30.

Figure 5:
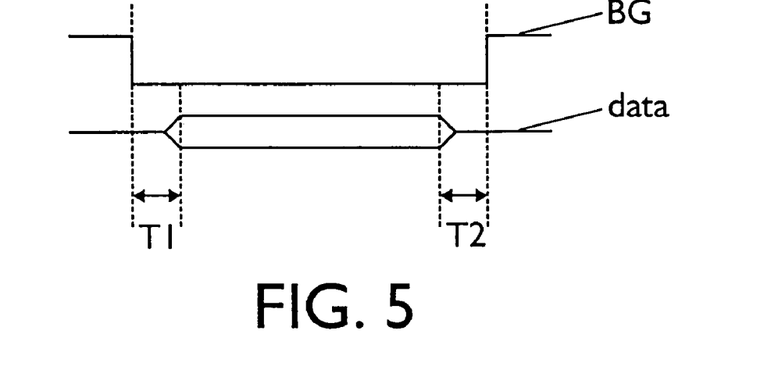
FIG. 5 shows part of a time diagram of two signals in the network.

In FIG. 5, this control signal is referenced BG and the actual message is referenced data. The control signal BG is, for example, in a low state during the transmission of a message. During this low state of the control signal the message is to be transmitted. A first time space T1, after a change of the control signal to the low state, and a second time space T2, before a change of the control signal to the high state, are then to be selected so that the active star node 9 is and continues to be configured correctly for the flawless transmission of a message. It is still to be observed that the TTP protocol supports different (constant) message delay times between various network nodes in the network. So doing, the delay time caused by the active star node 9 does not violate the TTP protocol.

The network according to the invention enables the transmission of a pilot signal with any type of signal transmission for the messages from a network node 1 to 4. For example, for the transmission of messages a symmetrical push-pull transmission, single line transmission or carrier frequency-modulated transmission can be selected. With an in-phase coupling of the line pairs 5 to 8 could be transmitted a supply voltage, for example, together with the transmission of a message.

Figure 6:
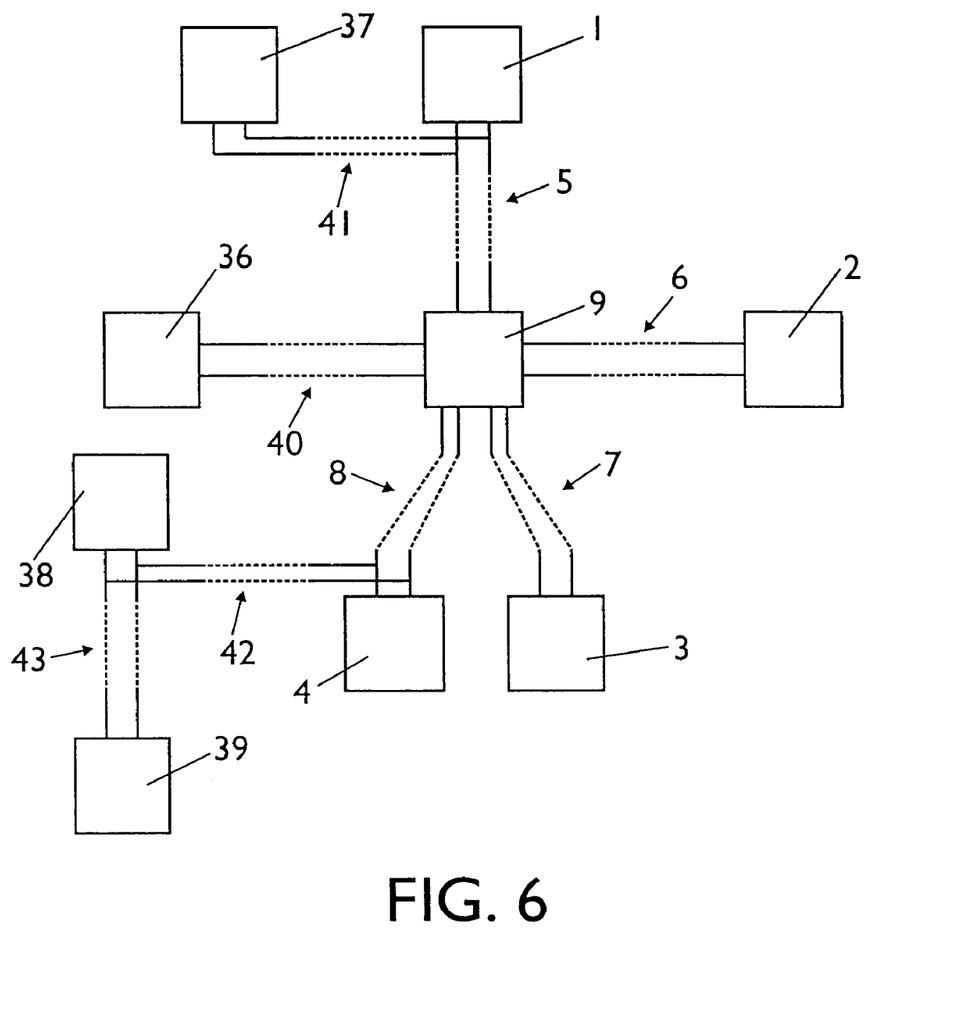
FIGS. 6 and 7 show two further embodiments of the network.

A further example of embodiment of a network is shown in FIG. 6. This network is almost identical with the network shown in FIG. 1 (network nodes 1 to 4 and line pairs 5 to 8), except for four additional network nodes 36 to 39. The network node 36 is coupled directly to the active star node 9 via a further line pair 40. The network node 37 is connected to the line pair 5 via a line pair 41. The network node 38 is connected to the line pair 8 via a line pair 42 and the network node 39 to the line pair 42 via a line pair 43.

Figure 7:
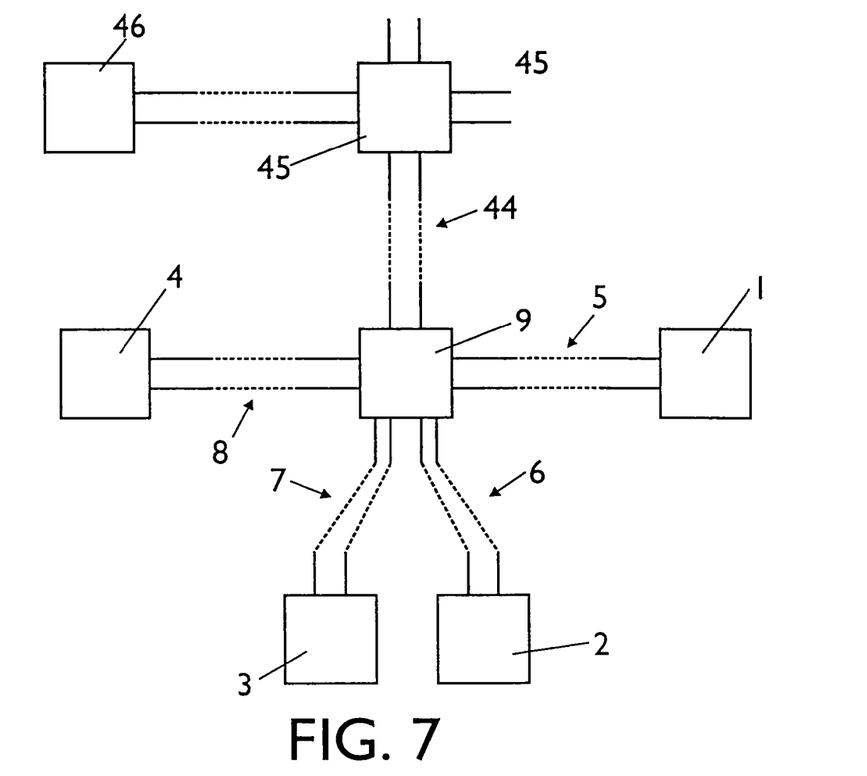

The example of embodiment shown in FIG. 7 again shows the topology of the network known from FIG. 1 with the network nodes 1 to 4, the line pairs 5 to 8 and the active star node 9. The active star node 9 is coupled via a line pair 44 to a further active star node 45 to which further network nodes may be connected. For example, a network node 46 is drawn in here.

Figure 8:
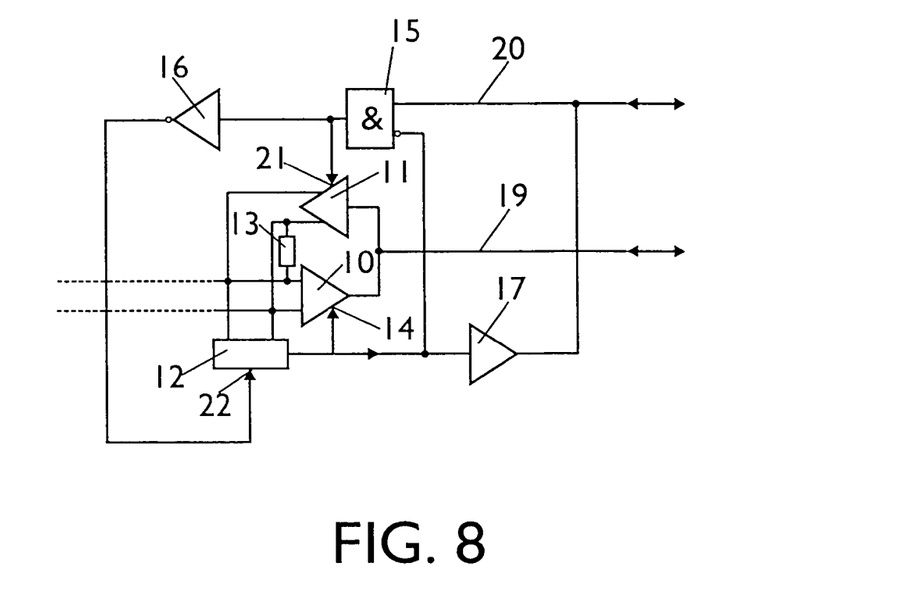
FIG. 8 shows a second embodiment of a star interface in a star node.

In lieu of the OR gate 23 necessary in FIG. 3, this OR combination may also be realized directly by a wired OR combination. A star interface suitable for the wired OR combination is shown in FIG. 8. This star interface as shown in FIG. 8 is identical with the star interface of FIG. 2 except for the switched combination of the output of the amplifier 17. In FIG. 8 the output of the amplifier 17 does not lead to the line 18, but to the line 20 (wired-OR). This provides that the output of the amplifier 17 is connected to the inverting input of the AND gate 15. The amplifier 17 is realized in FIG. 2 as a push-pull amplifier and in FIG. 8 as an open-collector or open-drain amplifier, respectively.

Figure 9:
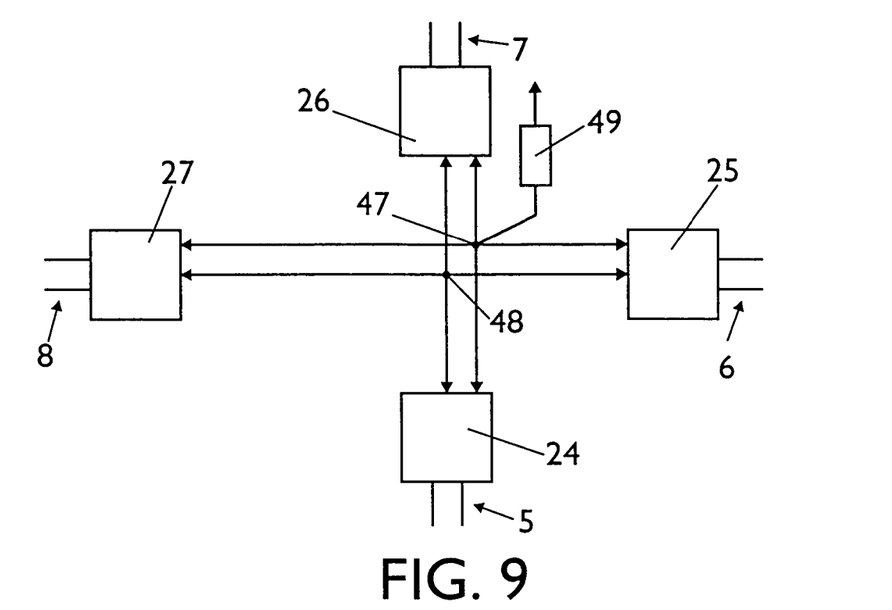
FIG. 9 shows a second embodiment of a first star node.

As a result of this wired OR combination, the cost of wiring is reduced and the OR gate 23 is omitted from the active star node and the network can easily be extended by further network nodes as a result of the omission of the OR gate, which is otherwise to be maintained in some variants. The star interfaces 24 to 27 are in this case connected to their respective lines 19 and 20 so that, as a result, they form two circuit nodes 47 and 48 as shown in FIG. 9. Only one resistor 49 is additionally to be provided, which is coupled, on the one hand, to the circuit node 47 and, on the other, to a supply voltage. Together with the amplifiers 17 of each star interface, this resistor forms the wired OR combination.

Figure 10:
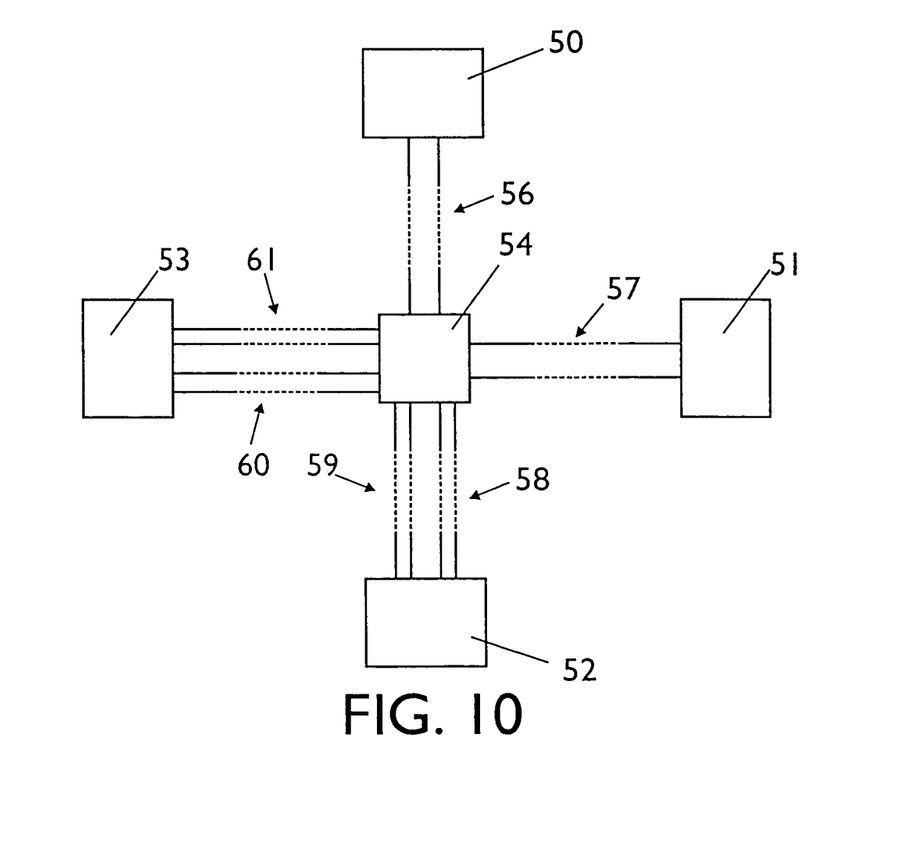
FIG. 10 shows an embodiment of a network comprising additional redundant components.

To enhance the availability of network nodes in a network, a plurality of line pairs and thus the assigned circuit components for generating a pilot signal (compare FIG. 4) are doubled, as is shown in FIG. 10. The network shown in FIG. 10 contains four network nodes 50 to 53 and one star node 54. The network nodes 50 and 51 are coupled to the star node 54 via respective line pairs 56 and 57 and the network nodes 52 and 53 are coupled to the star node 54 via two respective line pairs 58 to 61. This means that the network node 52 is connected to the star node 54 via the line pair 58 and 59 and the network node 53 via the line pair 60 and 61.

Figure 11:
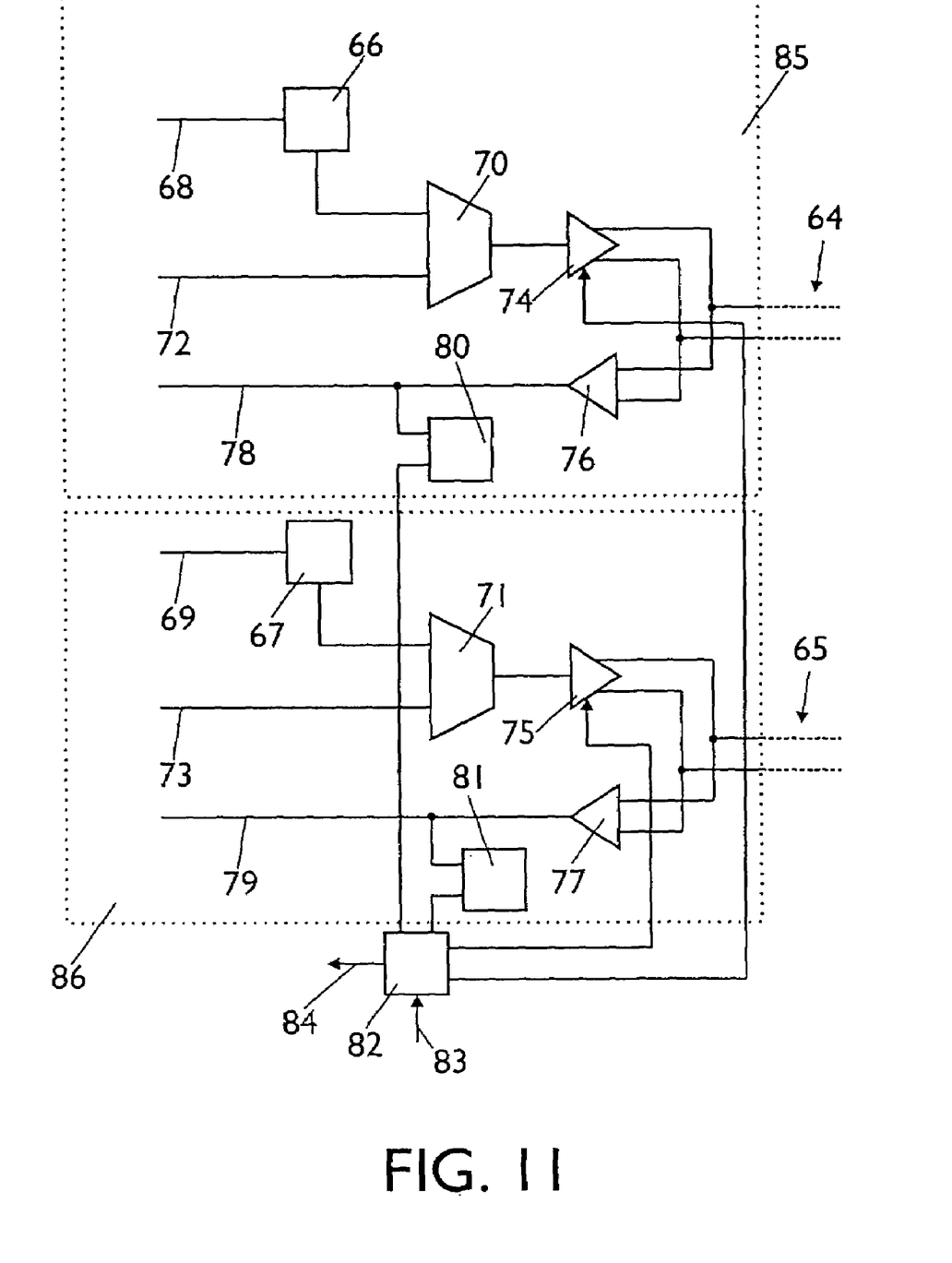
FIG. 11 shows a further embodiment of part of a network node comprising two pilot signal generators, pilot signal detectors and one controller.

FIG. 11 shows how a pilot signal is generated in a network node 52 and 53 and is transmitted over a line pair 64 or 65. For generating a pilot signal are used the pilot signal generators 66 and 67. The sending of a control signal over the lines 68 or 69 from a control unit 82 determines which pilot signal generator (66 or 67) generates a pilot signal. The pilot signal generator 66 or 67 delivers such a pilot signal to an associated multiplexer 70 or 71, respectively. The multiplexer 70 or 71 respectively, receives a message or data over a line 72 or 73. The output signal of the multiplexer 70 or 71 respectively, is applied to the respective line pair 64 or 65 via a switchable amplifier 74 or 75.

Data originating from the star node 54 are sent to an amplifier 76 or 77 via the line pair 64 or 65, respectively. The amplifier 76 or 77 delivers the data over a line 78 or 79 respectively, to further circuit components of the network node.

To the output of each amplifier 76 or 77 is connected a respective pilot signal detector 80 or 81. When a pilot signal detector 80 or 81 has detected a pilot signal, a control unit 82 (state machine) is informed thereof. This control unit 82 controls the two switchable amplifiers 74 and 75. Furthermore, the control unit 82 controls the pilot signal generators 66 and 67 over the lines 68 and 69. The start signal already mentioned above coming from the network node is led over a line 83 to the control unit 82, which forms a control signal from it for the pilot signal generators 66 and 67. The control unit 82 can report, for example, states to the network node via a line 84.

The circuit elements 66, 68, 70, 72, 74, 76, 78 and 80 form a first circuit component 85 and the circuit elements 67, 69, 71, 73, 75, 77, 79 and 81 form a second circuit component 86. The circuit components 85 and 86 have identical structures.

This control unit 82 manages the line pairs 64 and 65 connected to the network node, so that the operability of the line pairs 64 and 65 and of the circuit components 85 and 86 is tested continuously.

During the reception of a message, the control unit 82 checks whether the pilot signal has really arrived over the two line pairs 64 and 65. The arrival of a pilot signal on one of the two redundant line pairs signalizes the beginning of the reception of a message. In a certain time section the control unit 82 checks whether, after the first pilot signal has arrived on one of the line pairs 64 or 65, the pilot signal has arrived on the other line pair. If this is not the case, there may be assumed that the other line pair is defective.

Transmission basically takes place on only one of the redundant line pairs. To achieve that even if one of the circuit components 85 or 86 breaks down the communication can be kept going, during each transmission operation a check is made whether the pilot signal accompanying the message has really been transmitted. The structure of the network node ensures that the pilot signal is sent back to the transmitting network node via the very line pair that is not used for the transmission of a message. Here too, the control unit 82 checks whether the pilot signal arrives on the other line pair within another specific time section after the beginning of the transmission of the message.

The combination of these two checks enables to detect a defect of the circuit components 85 and 86 and line pairs 64 and 65 used at the time for the transmission of messages and to switch over the non-defective circuit components via the assigned non-defective line pair of the control unit 82.

If there is no error and thus the control unit 82 has registered the two line pairs 64 and 65 and the two circuit components 85 and 86 as working, the circuit components 85 and 86 for example alternately transmit to the assigned star interface. In the case of a defect, only the circuit component 85 or 86 registered as non-defective will transmit.

What is claimed is:

1. A network comprising:
   a plurality of network nodes, and
   a star node that is configured to be coupled to the plurality of network nodes to facilitate communication among the plurality of network nodes,
   wherein:
   the star node includes a plurality of star interfaces, each star interface of the plurality of star interfaces being assigned to at least one network node of the plurality of network nodes,
   each star interface is configured such that, in dependence on detection of a pilot signal from an assigned network node, the star interface that is assigned to the assigned network node autonomously controls the conveyance of a message from the assigned network node to the other star interfaces and therefrom to the other network nodes, and
   wherein each star interface includes:
      a first amplifier having a first input and a first output,
      a second amplifier having a second input and a second output,
      a pilot detector having a pilot input and a pilot output, wherein
      the first input, the pilot input, and the second output are commonly and directly coupled to the assigned at least one network node,
      the first output and the second input are commonly and directly coupled to the first output and second input of each other star interface, and
      the pilot output is operably coupled to the pilot input of each other star interface.

2. A network as claimed in claim 1, wherein
   each network node is assigned a periodically recurrent time section for the transmission of its messages, and
   each network node includes a pilot signal generator that is configured to generate a pilot signal that identifies the time section to the assigned star interface.

3. A network as claimed in claim 2, wherein
   at least one network node is assigned to more than one star interface, of which only one star interface is enabled to communicate messages in dependence on a state of the assigned network node.

4. A network as claimed in claim 3, wherein
   the at least one network node includes:
      at least two pilot signal generators, and
      at least two multiplexers for combining the pilot signal generated by the assigned pilot signal generator with a message, and
      a control unit that is configured to select a line connection and an assigned star interface for transmitting the message combined with the pilot signal.

5. A network as claimed in claim 4, wherein
   the at least one network node includes one or more pilot signal detectors, and
   the control unit is configured to test communications over the network based on detection of received pilot signals at each of the more than one star interfaces.

6. The network of claim 2, wherein
   the pilot signal includes one of:
      a signal that is time-division multiplexed with the message,
      a signal that is frequency-division multiplexed with the message, and
      a signal that is phase-division multiplexed with the message.

7. A network as claimed in claim 1, wherein
   each star interface includes a first and second switch element and a pilot signal detector,
   the first switch element is configured to allow a message to pass from the assigned network node to the other star interfaces and
   the second switch element is configured to allow a message to pass from the other star interfaces to the assigned network node and
   the pilot signal detector is configured to selectively control the first and second switch elements based upon detection of a pilot signal from the assigned network node.

8. A network as claimed in claim 7, wherein
   the first and second switch elements are each a switchable amplifier.

9. A network as claimed in claim 1, wherein
   each star interface is configured to generate a release signal upon receipt of a pilot signal from the assigned network node, and
   the star node is configured to propagate the release signal to the plurality of star interfaces.

10. A network as claimed in claim 9, wherein
    the star node is configured to propagate the release signal via a wired OR combination of the release signal from each star interface.

11. The network of claim 1, wherein
    each star interface is selectively operable in one of a receive mode and a transmit mode, and
    each star interface includes
       a pilot detector that is configured to detect the pilot signal from the assigned network node and selectively set its interface to receive mode, and each of the other star interfaces to transmit mode,
    wherein
    in the receive mode, the star interface is configured to receive messages from its assigned at least one network node, and
    in the transmit mode, the star interface is configured to transmit messages to its assigned at least one network node.

12. The network of claim 11, wherein
    the pilot signal includes one of:
       a signal that is time-division multiplexed with the message,
       a signal that is frequency-division multiplexed with the message, and a signal that is phase-division multiplexed with the message.

13. The network of claim 1, wherein
the pilot output of all of the star interfaces are commonly and directly coupled to the pilot input of all of the star interfaces.

14. The network of claim 1, wherein
at least one of the first and second amplifiers is a switchable amplifier having an enable input, and
the pilot output of each star interface is operably coupled to the enable input of the at least one switchable amplifier of each other star interface.

15. A star node in a network for coupling a plurality of network nodes, comprising
a plurality of star interfaces, each star interface of the plurality of star interfaces being assigned to at least one network node of the plurality of network nodes,
wherein
each star interface is configured to:
  detect a pilot signal generated by a network node that is assigned to the star interface, and
  autonomously control each of the other star interfaces to enable transmission of a message associated with the pilot signal to each of the other network nodes in the network, and
wherein each star interface includes:
  a first amplifier having a first input and a first output,
  a second amplifier having a second input and a second output,
  a pilot detector having a pilot input and a pilot output, wherein
    the first input, the pilot input, and the second output are commonly and directly coupled to the assigned at least one network node,
    the first output and the second input are commonly and directly coupled to the first output and second input of each other star interface, and
    the pilot output is operably coupled to the pilot input of each other star interface.

16. The star node of claim 15, wherein
each star interface is selectively operable in one of a receive mode and a transmit mode, and
each star interface includes
  a pilot detector that is configured to detect the pilot signal and selectively set its interface to receive mode, and each of the other star interfaces to transmit mode,
wherein
in the receive mode, the star interface is configured to receive messages from its assigned one or more network nodes, and
in the transmit mode, the star interface is configured to transmit messages to its assigned one or more network nodes.

* * * * *